(12) United States Patent
Yoneda et al.

(10) Patent No.: US 6,596,129 B1
(45) Date of Patent: Jul. 22, 2003

(54) DISTILLATION PROCESS FOR EASILY POLYMERIZABLE SUBSTANCE-CONTAINING SOLUTION

(75) Inventors: Yukihiro Yoneda, Himeji (JP); Takeshi Nishimura, Himeji (JP); Yasuhiro Shingai, Himeji (JP); Hajime Matsumoto, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/702,588

(22) Filed: Oct. 31, 2000

(30) Foreign Application Priority Data

Nov. 8, 1999 (JP) .......................... 11-317548

(51) Int. Cl.7 .................... B01D 5/00; C07C 51/42
(52) U.S. Cl. ............... 203/2; 203/6; 203/8; 203/87; 203/DIG. 21; 562/600
(58) Field of Search ............... 203/87, 6, 8, 1, 203/3, DIG. 21, DIG. 18, 2, 100; 562/600; 202/186, 160; 159/44

(56) References Cited

U.S. PATENT DOCUMENTS

| | | | |
|---|---|---|---|
| 3,087,867 A | | 4/1963 | Bortolini et al. |
| 3,914,290 A | * | 10/1975 | Otsuki et al. ............... 560/205 |
| 3,951,756 A | * | 4/1976 | Dirks et al. .................. 203/95 |
| 4,257,945 A | | 3/1981 | Martel |
| 4,365,081 A | | 12/1982 | Shimizu et al. |
| 4,369,097 A | | 1/1983 | Nezu et al. |
| 4,390,398 A | * | 6/1983 | Coker et al. ............... 203/87 |
| 4,406,745 A | | 9/1983 | Martel |
| 4,554,054 A | * | 11/1985 | Coyle ......................... 203/15 |
| 4,986,884 A | | 1/1991 | Arlt et al. |
| 5,209,827 A | * | 5/1993 | Butler et al. ................ 203/72 |
| 5,770,021 A | | 6/1998 | Hego et al. |
| 5,897,749 A | | 4/1999 | Kroker et al. |

FOREIGN PATENT DOCUMENTS

| | | |
|---|---|---|
| DE | 28 17 963 A1 | 11/1978 |
| EP | 0 398 226 A2 | 11/1990 |
| EP | 1 059 281 A1 | 12/2000 |
| JP | 60-13739 A | 1/1985 |
| JP | 60-43056 B2 | 9/1985 |
| JP | 3-17044 A | 1/1991 |
| JP | 9-20711 A | 1/1997 |
| JP | 9-110778 A | 4/1997 |
| JP | 10-204030 A | 8/1998 |
| WO | WO 99/26911 A1 | 6/1999 |

* cited by examiner

*Primary Examiner*—Virginia Manoharan
(74) *Attorney, Agent, or Firm*—Haugen Law Firm PLLP

(57) ABSTRACT

The present invention provides: a process can be preventive of a polymerization in a distillation apparatus when distilling a solution containing easily polymerizable substances such as (meth)acrylic acid and (meth)acrylic acid ester. In the distillation process for an easily polymerizable substance-containing solution which includes the step of distilling an easily polymerizable substance-containing solution by a distillation column equipped with a condenser for condensation at a vapor outlet of the distillation column, at least one condenser for polymerization inhibition is further placed in series on a vapor outlet side of the condenser for condensation, and the easily polymerizable substance which is contained in vapor from an upstream condenser is condensed by a downstream condenser.

13 Claims, 3 Drawing Sheets

DISTILLATION PROCESS FOR EASILY POLYMERIZABLE SUBSTANCE-CONTAINING SOLUTION

BACKGROUND OF THE INVENTION

A. Technical Field

The present invention relates to a distillation process for a solution containing easily polymerizable substances such as (meth)acrylic acid and (meth)acrylic acid ester.

B. Background Art

In a process of distilling a solution containing easily polymerizable substances such as (meth)acrylic acid and (meth)acrylic acid ester, a method comprising the step of adding a polymerization inhibitor and/or supplying a gas containing molecular oxygen is adopted with lowering a temperature as low as possible under a reduced atmosphere in order to suppress a polymerization during distillation.

Figure 1:
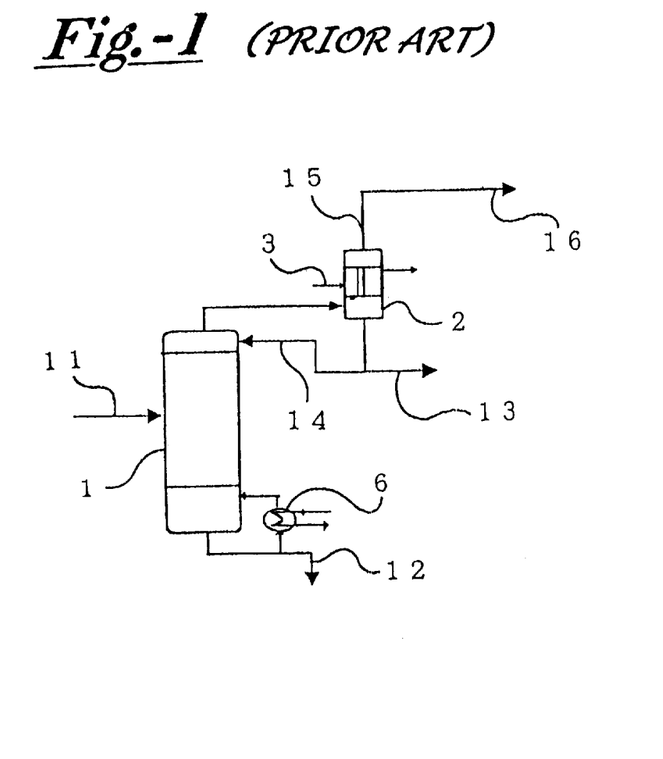
FIG. 1 is a rough explanation figure describing a prior process.

For example, FIG. 1 illustrates a prior distillation process for an easily polymerizable substance-containing solution, and illustrates a distillation column (1) and a condenser (2). Vapor from an overhead column of the distillation column (1) is supplied upward to a tube side of the condenser (2) and a condensate condensed by cooling water (3) is obtained from a distillate line (13) (a portion of the distillate is introduced into a reflux line (14)). In addition, vapor from the condenser is introduced into a line for atmospheric or vacuum system through a condenser gas outlet line (15).

Figure 2:
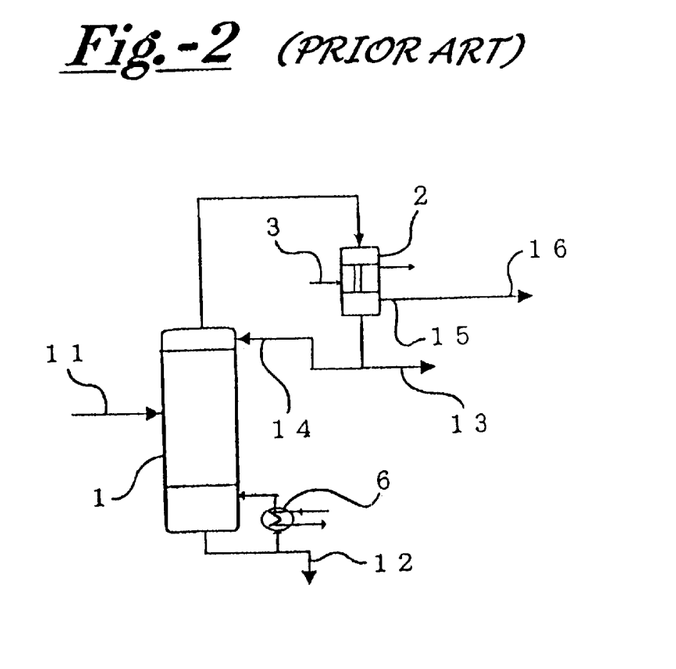
FIG. 2 is a rough explanation figure describing a prior process.

FIG. 2 illustrates another prior distillation process for an easily polymerizable substance containing-solution, and illustrates a distillation column (1) and a condenser (2). However, vapor from an overhead column of the distillation column (1) is supplied downward to a tube side of the condenser (2) as opposed to FIG. 1 and a condensate condensed by cooling water (3) is obtained from a distillate line (13) (a portion of the distillate is introduced into a reflux line (14)). In addition, vapor from the condenser is introduced into a line for atmospheric or vacuum system through a condenser gas outlet line (15).

However, in these processes representative of the prior distillation process, vapor from the condenser contains an easily polymerizable substance. Therefore, it is under a circumstance impossible to stably operate because polymerized products are formed in a line from a condenser to an ejector or a vacuum pump, in a line from a condenser to an atmosphere or a harm removal equipment, at an outlet of a ejector, or in a vacuum pump, and it is often necessary to stop operation.

SUMMARY OF THE INVENTION

A. Object of the Invention

An object of the present invention is to provide: a process can be preventive of a polymerization in a distillation apparatus when distilling a solution containing easily polymerizable substances such as (meth)acrylic acid and (meth)acrylic acid ester.

B. Disclosure of the Invention

The present inventors diligently studied to solve the above-mentioned problems. As a result, they found that: the above-mentioned problems can be solved if a distillation column is now newly equipped with at least one condenser for polymerization inhibition in series on a vapor outlet side of a condenser for condensation as equipped to a vapor outlet of the distillation column and if the vapor from an upstream condenser outlet is supplied to a downstream condenser. They completed the present invention in this way.

That is to say, a distillation process for an easily polymerizable substance-containing solution, according to the present invention, comprises the step of distilling an easily polymerizable substance-containing solution by a distillation column equipped with a condenser for condensation at a vapor outlet of the distillation column, wherein at least one condenser for polymerization inhibition is further placed in series on a vapor outlet side of the condenser for condensation, and wherein the easily polymerizable substance which is contained in vapor from an upstream condenser is condensed by a downstream condenser.

These and other objects and the advantages of the present invention will be more fully apparent from the following detailed disclosure.

(Explanation of the Symbols):
1: Distillation column
2: First condenser
3: First cooling water
4: Second condenser
5: Second cooling water
6: Reboiler
11: Feed line
12: Bottom line
13: Distillate line
14: Reflux line
15: Line for first condenser gas outlet
16: Line for atmosphere or vacuum system (such as ejector)
17: Condensate line of second condenser

DETAILED DESCRIPTION OF THE INVENTION

A distillation process for an easily polymerizable substance-containing solution, according to the present invention, comprises the step of distilling an easily polymerizable substance-containing solution by a distillation column equipped with a condenser for condensation at a vapor outlet of the distillation column, wherein at least one condenser for polymerization inhibition is further placed in series on a vapor outlet side of the condenser for condensation, and wherein the easily polymerizable substance which is contained in vapor from an upstream condenser is condensed by a downstream condenser.

A polymerizable monomer corresponds to the easily polymerizable substance used in the present invention, examples thereof include acrylic acid, methacrylic acid, maleic anhydride, acrylonitrile, esters thereof or derivatives thereof. The easily polymerizable substance may be a mixture including a high boiling substance, a solvent, or a by-product when producing the easily polymerizable substance, in addition to these examples. Among these, acrylic acid, acrylic acid ester (such as methyl ester, ethyl ester, butyl ester, 2-ethylhexyl ester), methacrylic acid, methacrylic acid ester (methyl ester, ethyl ester, propyl ester, isopropyl ester, butyl ester, isobutyl ester, tert-butyl ester, cyclohexyl ester), dimethylaminoethyl (meth)acrylate and hydroxyalkyl (meth)acrylate.

If the sum of condensers used in the present invention are two units or more in total of the condensers for condensation and the condensers for polymerization inhibition, the more the condensers are, the more effectively a stable operation is carried out. Therefore, it is not preferable that the condensers are too many because equipment and piping become complicated and an equipment investment becomes increased. In the case where the sum are two to four units, the distillation process reaches the level economically. In the case where the sum are two units, it is effective enough. In the case where the sum is one unit, it is not preferable because a polymerization happens at a downstream piping or fittings after an outlet pipe of the condenser, or at a vacuum apparatus or a blower, and the stable operation cannot be carried out. If the sum are two or more units in total of the condensers for condensation and the condensers for polymerization inhibition, the stable operation can be carried out for a long time.

The shorter a pipe connected to the respective condensers is, the more effectively a polymerization is preferably inhibited. In addition, it is preferable to slope the pipe at an angle of not less than 1° with a horizontal line so that a condensate or a mist can flow rapidly.

As to the condenser used in the present invention, the most upstream condensers for condensation may be either alone or comprise plural units arranging in series or in a row. The condensate is made as much as possible by this condenser for condensation. Then, a characteristic of the present invention is that this most upstream condenser for condensation is further equipped with at least one condenser for polymerization inhibition in series.

In the present invention, among the plural condensers placed in series, of a liquid portion and a vapor portion of a fluid at an upstream condenser outlet, the vapor portion is supplied to a downstream condenser. Supplying the vapor portion is not especially limited in the present invention, whether the vapor includes an entrainment or not.

In the present invention, it is preferable that: a refrigerant inlet temperature of the most upstream condenser for condensation is in the range of 3 to 50° C., a refrigerant inlet temperature of the most downstream condenser for polymerization inhibition is in the range of 0 to 50° C., and a refrigerant inlet temperature of at least one condenser is lower than a refrigerant outlet temperature thereof by 1 to 25° C.

In the case where the refrigerant inlet temperature of the most upstream condenser for condensation is more than 50° C., it is not preferable because the area of the heat-transfer surface of the condenser becomes large with poor economy and a rise of temperature easily causes a polymerization. In the case where the refrigerant inlet temperature of the most upstream condenser is less than 3° C., it is possible to operate. However, it is not preferable because it is necessary to cool with a chiller and so on, and there are many cases where load thereof becomes heavy with poor economy.

In the case where the refrigerant inlet temperature of the most downstream condenser for polymerization inhibition is more than 50° C., it is not preferable because an uncondensed vapor at a condenser gas outlet becomes much, it is possible to cause a polymerization in a pipe at the condenser gas outlet, and the size of the condenser becomes extremely large in order to diminish the uncondensed vapor. The lower a temperature is, the higher the effect of the present invention is. However, it is poor economy if the temperature is too low. In the case where the refrigerant inlet temperature of the most downstream condenser is less than 0° C., it is not preferable because a trouble due to freeze happens in the case where a process fluid includes water even a trace. If the process fluid includes a component to freeze, it is preferable to consider so that the refrigerant temperature may not become too low.

Among the plural condensers in series, in the case where a difference between the refrigerant inlet temperature of at least one condenser and the refrigerant outlet temperature thereof is less than 1° C., it is not preferable because the flow rate of the refrigerant becomes in excess of that needed. In the case where the difference is more than 25° C., it is preferable because the flow rate of the refrigerant can be spared with a few amount and piping and so on becomes compact. However, it is not preferable because ununiform portions such as a stagnate in a flow of the refrigerant in the condenser is apt to be formed, a temperature of the portions rises locally, the easily polymerizable substance is apt to be polymerized, the substantial and effective area of the heat-transfer surface acting in the condenser diminishes by clogging an inside portion of a heat-transfer tube with polymerized products, and a difficulty during operation arises. Especially it is preferable that the refrigerant inlet temperature of the most upstream condenser for condensation is lower than the refrigerant outlet temperature thereof by 1 to 25° C.

In the present invention, the above refrigerant is not especially limited if it is a liquid, and can be selected according to a temperature range at which the refrigerant is used. A process fluid used in a production process can cool in order to recover a heat of condensation. An organic material can be used as the refrigerant. However, examples thereof include a solution or water preferably because they have an effect on cooling highly as the refrigerant and are easily available. Examples of the solution include brine as antifreeze (a solution of calcium chloride and so on) and an ethylene glycol solution. Examples of the water includes deionized water, transmitted water through a reverse osmotic membrane, industrial water and sea water. If necessary, a treatment of chemicals such as a disinfectant, an anticorrosive and a scale-inhibitor to the solution or the water can be carried out. The temperature of the solution or the water as a refrigerant used for cooling the condenser and having a high temperature thereafter, is returned to a temperature necessary to cool the condenser by use of a cooling tower or a chiller.

An effect according to the present invention can be obtained even if the refrigerant inlet temperature of the most upstream condenser for condensation is equal to the refrigerant inlet temperature of the most downstream condenser for polymerization inhibition. However, it is effective that the refrigerant inlet temperature of the most downstream condenser is lower than the refrigerant inlet temperature of the most upstream condenser. In the case where the refrigerant inlet temperature of the most downstream condenser that is higher than the refrigerant inlet temperature of the most upstream condenser, it is not preferable because a portion not to condense increases at the outlet of the downstream condenser and effects on inhibiting a polymerization is lowered. It is preferable that the refrigerant temperature of the downstream condenser is lower. However, it is not actual that the refrigerant temperature of the downstream condenser is lower by 40° C. or more.

In addition, it is effective that the refrigerant is utilized effectively by returning a refrigerant from the outlet of the downstream condenser to the inlet of the most upstream condenser for condensation. Furthermore, it is effective that: cooling water cooled in the cooling tower is utilized as a refrigerant of the most upstream condenser for condensation, and antifreeze and water cooled by the chiller is utilized as a refrigerant of the downstream condenser. In this case, not only effects on inhibiting a polymerization in lines from the outlet of the condenser gas to an exhaust-vacuum system is high, but also there is an effect that a heat duty of the chiller is dramatically more decreased than that by the whole condensates by the chiller. Therefore, is preferable economically. For example, in the case where the cooling water cooled in the cooling tower is utilized for the most upstream condenser for condensation in order to have a heat duty corresponding to the almost whole condensates and the cooling water cooled by the chiller is utilized for the downstream condenser, the whole vapor can be caused to condense effectively and the effect on inhibiting a polymerization can be obtained highly though the heat duty of the chiller is slight.

In the present invention, the more condensate amounts from the most upstream condenser for condensation are, the more preferable it is. The condensation ratio of the most upstream condenser for condensation is preferably not less than 85% by the whole condensates, more preferably not less than 90%, still more preferably not less than 96%, most preferably the whole condensates. In addition, it is not especially necessary to operate in order to adjust the temperature and the flow rate of the refrigerant for the purpose of such as diminishing the condensate amounts. The temperature and the flow rate of the refrigerant can be adjusted as cool as possible.

The sum of condensation ratios of plural condensers is the whole condensates ideally. However, an actual condensation ratio is preferably not less than 96%, more preferably not less than 99%, most preferably not less than 99.9%.

A method of passing the condensates from the condensers, according to the present invention, may comprise the step of passing the condensates from the respective condensers independently, or collecting the condensates from the respective condensers at the same portion. However, a solution containing (meth)acrylic acid or an ester thereof is easily polymerizable. Therefore, it is preferable that the condensate from the downstream condenser is caused to join to the condensate from the upstream condenser and they are collected at the same portion. The condensate from the most upstream condenser for condensation contains much stabilizer because of entrainment of a solution containing the stabilizer from the distillation column. Therefore, the condensate from the downstream condenser is caused to join to the condensate from this most upstream condenser for condensation as soon as possible and a polymerization in the condensate line of the downstream condenser can be inhibited. Particularly, a more preferable mode is that a condensate from at least one condensers except for the most upstream condenser for condensation is caused to join to that of the most upstream condenser for condensation. The condensers and vapor lines can be showered with the resultant condensate by causing to flow together with the stabilizer as mentioned later.

Furthermore, in the present invention, a preferable mode is to return at least one portion of the condensate from the most upstream condenser for condensation to the distillation column. It is preferable that the stabilizer contained in the condensate of the condenser can be returned to the distillation column again and the stabilizer can be circulated and reused in the columns and condensers themselves.

The condensate condensed by the condenser can be added to a tank The condensate from the respective condensers can be added to the same tank through separate lines, but it is preferable that the condensate from the respective condensers is once collected through lines and added to the tank thereafter. The condensate from the most upstream condenser for condensation contains plenty of the above stabilizer because of entrainment of a solution containing the stabilizer from the distillation column. Therefore, polymerization in the condensate line of the downstream condenser can be inhibited because the condensate from the respective condensers is caused to collect through the lines and join. In addition, a pool portion can be placed in a lower channel of the most upstream condenser for condensation and the condensate from the downstream condenser can be introduced therein. In addition, for example, a liquid level of the pool portion is automatically measured, and a solution can be discharged by use of a pump in order to keep a set level. Then, a portion of the solution can be utilized in order to make reflux in the column, another portion can be utilized as a distillate, and the other portion can be utilized in order to shower in the condenser. In this case, the distillate is generally transferred in order to keep the set level of the pool by manipulating the flow rate of the distillate. If the respective condensates are collected at the same portion, piping become simple, equipments become diminished and systems become simple in this way. Therefore, it is preferable in consideration of charge of polymerization inhibitors and economy of the systems.

Forms of the condensers in the present invention are not especially limited, but examples thereof include a horizontal shell-and-tube-type heat exchanger, a vertical shell-and-tube-type heat exchanger and a barometric condenser that can shower vapor phase with a solution cooled by a liquid cooler by forced-circulating the condensate. However, the horizontal shell-and-tube-type heat exchanger often causes to condense outside of the tube side on its shell side and it is difficult to wash in the case of causing troubles derived from the polymerization. In addition, it is necessary to supply the stabilizer uniformly to inhibit the polymerization and to carry out such as sub-cooling the solution to a lower temperature enough in order to operate stably. Therefore, the vertical shell-and-tube-type heat exchanger and the barometric condenser are preferable and the vertical shell-and-tube-type heat exchanger is more preferable. The barometric condenser is preferable because of inhibiting the polymerization though the apparatus size thereof becomes larger. The liquid cooler in this case is not especially limited, but examples thereof include a shell-and-tube-type heat exchanger, a spiral plate type cooler and a plate and frame type cooler.

If the condenser is a vertical shell-and-tube-type heat exchanger in the present invention, vapor can be passed to its shell side or tube side. However, if the vapor is passed to the shell side, it is difficult to wash when causing troubles derived from the polymerization. In addition, a liquid film outside of the tube side is formed ununiformly when adding a solution containing the stabilizer by a shower method, and a portion not having enough stabilizer concentration in the condensate arises. Therefore, a trouble derived from the polymerization is apt to arise. On the other hand, if the vapor is passed to the tube side, it is easy to wash when causing troubles derived from the polymerization. In addition, it is preferable to operate stably because a liquid film is apt to be formed uniformly when adding a solution containing the stabilizer by a shower method, the stabilizer acts to the condensate even from the most upstream condenser for condensation and it is difficult to polymerize the condensate.

If the most upstream condenser for condensation is a vertical shell-and-tube-type heat exchanger in the present invention, vapor can be passed inside of the tube side upward or downward in operation. If the vapor is passed upward and if the vapor flow rate (duty) is much, flooding happens because the condensate and/or a shower solution containing the stabilizer is passed downward. Therefore, it is not preferable. In addition, it is not preferable because a flow path becomes narrow when a little polymerization arises partially, the flooding happens so that the operation cannot be continued. In addition, if the vapor is passed upward, most of the vapor condenses at a lower tube portion. Therefore, the resultant solution is not cooled enough and the temperature of the condensate becomes higher. However, the resultant solution is cooled enough if the vapor is passed downward. Therefore, it is preferable to inhibit the polymerization. Accordingly, it is preferable that the vapor is passed downward because the operation range becomes wide and stable operation can be carried out for a long time even if a polymer of a small size is formed rarely. In addition, it is preferable in order to inhibit a polymerization in the condensers and in lines from the condensers to an ejector or a vacuum pump.

In the present invention, as mentioned above, it is preferable that the vapor is passed downward to a tube side of the most upstream condenser for condensation. However, it is preferable that the vapor is passed upward or downward to a tube side of a condenser except for the most upstream condenser for condensation. In addition, as is similar to the most upstream condenser for condensation, it is preferable that the vapor is passed downward to the tube side of the condenser except for the most upstream condenser for condensation because a condensate temperature can be lowered more.

In the present invention, a solution containing the stabilizer is supplied preferably into at least one condenser selected from the plural condensers, more preferably into the downstream condenser by its shower. This shower has an effect on inhibiting the polymerization in the condensers and lines very much. The solution containing the stabilizer may be a solution mixed with the condensate from the condenser and the stabilizer, or a solution mixed with other process fluid and the stabilizer. However, the former one is preferable. Particularly, a solution mixed with the stabilizer and a condensate obtained by joining the condensate from the downstream condenser to the condensate from the upstream condenser and collecting at the same portion as mentioned above, is preferable. Unless the condenser is showered, a new condensate obtained by condensing in the condenser does not contain the stabilizer. Therefore, it is not preferable because the polymerization occurs.

If the respective condensates from the condensers are passed separately, the respective condensates from the condensers have tanks or pools for the condensates separately and the respective condensers are caused to shower with the respective condensates in order to inhibit the polymerization. In this case, not only a shower pump cannot be held in common, but also the respective condensates are used as a solvent to dissolve the stabilizer and respective stabilizer solution tanks are necessary. Therefore, the system becomes complicated and it is not preferable in view of management and economy.

The more downstream the condenser is placed, the more low boiling component the vapor composition of the condenser has. The low boiling component may include an easily polymerizable impurity. This impurity is one of causes of forming the polymerized product in the line from the ejector and the vacuum pump, at a line of ejector outlet portion from the condenser of ejector to the atmosphere or an equipment to get rid of harm, or in the vacuum pump. Therefore, if the respective condensers are caused to shower with the respective condensates, the downstream condenser is caused to shower with a solution containing much low boiling polymerizable substance. Therefore, it is difficult to exclude the easily polymerizable substance as the low boiling component contained in the vapor no matter how the temperature may be lowered, and it is not preferable because the polymerized product is apt to be formed in the line from the ejector and the vacuum pump, at the line of ejector outlet portion from the condenser to the atmosphere or the equipment to get rid of harm, or in the vacuum pump.

On the other hand, if the condensate from the downstream condenser is joined to a line for the condensate from the upstream condenser, the resultant condensate is collected at the same portion and the respective condensers are caused to shower with the common solution, the respective condensers are caused to shower with a solution having a low concentration of the low boiling polymerizable substance. Therefore, it is preferable because the easily polymerizable substance as the low boiling component contained in the vapor can be excluded and it is difficult to form the polymerized product in the line from the ejector and the vacuum pump, at the line of ejector outlet portion from the condenser to the atmosphere or the equipment to get rid of harm, or in the vacuum pump.

Examples of the distillation column used in the present invention, include a simple distillation column and rectifying columns such as a packed column, a bubble cap column and a perforated-plate column. Especially, a distillation column comprising plural sieve trays or a distillation column comprising packing elements is preferable. A multi-plated perforated-plate column is preferable in view of ensuring purity and removing a polymerized product.

The distillation column comprises a reboiler, the form thereof is not especially limited, but examples of shell-and-tube-type heat exchangers include a vertical shell-and-tube-type thermosiphon reboiler, a vertical shell-and-tube-type falling film reboiler and a forced-circulation reboiler. The forced-circulation reboiler of which heat transfer surface has hardly any gas phase is preferable in view of inhibiting the polymerization. In addition, the vertical shell-and-tube-type thermosiphon reboiler is also preferable in view of inhibiting the polymerization.

The distillation temperature range in the present invention is not especially limited, but is preferably in the range of 30 to 150° C. as is dependent on polymerizability of the easily polymerizable substance. It is necessary for the condensate and gas temperature to be lower than the distillation temperature, especially a column top temperature. Therefore, in the case where the column top temperature of the distillation is less than 30° C., uncondensed vapor increases at the condenser gas outlet and the possibility of polymerization is considered in the gas outlet piping of the condenser. In addition, it is not preferable because the size of the condenser becomes extremely enlarged in order to diminish the uncondensed vapor. In the case where the distillation temperature is more than 150° C., it is not preferable because the easily polymerizable substance is often polymerized in the distillation column of the condenser.

Incidentally, the above distillation temperature range includes temperature ranges such as a bottom temperature in the distillation column, a column top temperature in the distillation column, and an about middle temperature in the distillation column in the case where the column is a packed column or a plate column.

The distillation pressure range in the present invention is not especially limited. However, the range is dependent on a distilling operation temperature and the distillation becomes operated under vapor pressure at the temperature of mixtures of substances to be distilled. In the practical operation, the pressure is controlled in order to keep constant and the temperature is controlled in order to keep 30 to 150° C. The operating pressure in the present invention may be higher than, or near, or lower than atmospheric pressure. Particularly, if vacuum apparatuses such as a Roots type vacuum pump, a nash pump and ejector are used under below atmospheric pressure in the process of the present invention, there is an effect on inhibiting the polymerization in the vacuum apparatus.

In the present invention, the area of the heat-transfer surface of the downstream condenser is preferably 1 to 100% of that of the most upstream condenser for condensation. In the case where the area of the heat-transfer surface of the downstream condenser is less than 1% of that of the most upstream condenser for condensation, effects according to the present invention is not sufficient. In addition, in the case where more than 100%, the effects according to the present invention can be obtained. However, it is not preferable because enlarging more than the area of the heat-transfer surface of the most upstream condenser for condensation becomes enlarging that of the downstream condenser extremely and equipment investment increases. The area of the heat-transfer surface is preferably 1 to 100%, more preferably 3 to 50%.

In addition, in order to inhibit the polymerization in the vapor lines of the condenser inlet, the following exemplified methods may be applied: methods comprising the step of heating by use of heating trace or a heating jacket pipe in order to prevent the vapor that cause the polymerization from condensing; methods comprising the step of cooling by use of cooling trace or a cooling jacket pipe enough; and methods comprising the step of keeping a liquid film of the condensate in order to inhibit the polymerization, and showering with the solution containing the stabilizer in order to inhibit the polymerization. In this case, the solution containing the stabilizer is recovered with the condensate of the condenser.

In the present invention, the vapor lines of the condenser inlet is especially limited, but can be showered or not with the solution containing the stabilizer. There are effects on inhibiting the polymerization without showering because the uncondensed vapor at the condenser gas outlet decreases dramatically. However, the effects on inhibiting the polymerization increase further if showered.

In combination with the present invention, as to the lines from the condenser gas outlet to the exhaust-vacuum system, the polymerization can be inhibited by heating with the jacket pipe or trace in order to prevent the vapor from condensing, or by cooling. In addition, adding a gas containing molecular oxygen into the distillation column with the polymerization inhibitors in order to inhibit the polymerization may be used at the same time. If the gas containing molecular oxygen is added into the distillation column, it is preferable that the gas is added in order that the flow rate by weight of the oxygen contained in the above gas may be not more than 2% of that of the whole condensates or that of the vapor at the inlet of the most upstream condenser for condensation. In the case of more than 2 weight %, it is not preferable because a problem as to the polymerization in the vapor lines behind the condenser is apt to arise. The effects according to the present invention can be obtained without the gas containing oxygen. However, it is not preferable because the polymerization at portions of the distillation column or the reboiler is apt to arise in this case. In addition, the position where the gas containing molecular oxygen is added is not especially limited, but the gas is added preferably into a solution at portion of the reboiler inlet or at the column bottom. So far forth, even if a trouble of the polymerization arises in the case where a countermove like this is only carried out, a stable operation can be carried out according to the present invention. If the prior method and the present invention method are used at the same time, further effective results can be obtained.

As is mentioned above, the object of the present invention is to inhibit the polymerization of the easily polymerizable substance in the distillation. However, the distillation operation in order to condense the whole vapor can be carried out effectively as an additional effect, and the recovery ratio of the desired product can be increased. In the prior arts, even if an attempt is made to entirely condense the easily polymerizable substance using only one condenser with the area of the heat-transfer surface thereof increased, not only is the entire condensation insufficient, but also the problem of the polymerization arises. Not only it is possible to inhibit the polymerization in the distillation operation according to the present invention, but also it is possible to carry out the almost perfect operation in order to condense the whole vapor and the recovery ratios of the desired product and raw material are increased. (Effects and Advantages of the Invention):

The process according to the present invention, enables to inhibit the polymerization in the distillation apparatus when distilling the solution containing easily polymerizable substances such as (meth)acrylic acid and (meth)acrylic acid ester.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples.

EXAMPLE 1

Figure 3:
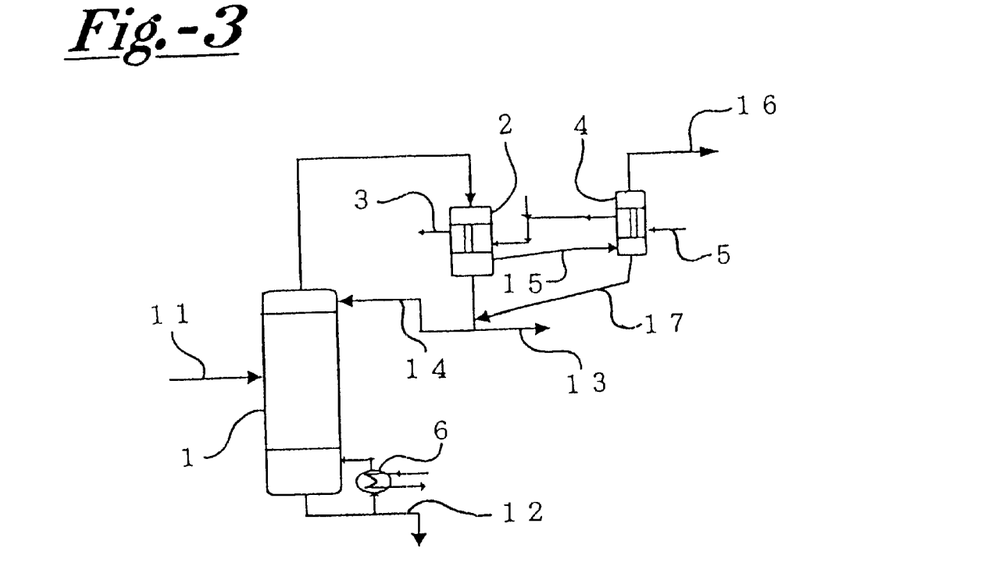
FIG. 3 is a rough explanation figure describing an example according to the present invention.

As is shown in FIG. 3, a distillation apparatus was used and equipped with a distillation column, a reboiler, a first vertical shell-and-tube-type condenser, a second vertical shell-and-tube-type condenser and an ejector. A solution containing acrylic acid was supplied to the distillation column, a gas containing oxygen in order to inhibit a polymerization was added into a distillation column bottom, the apparatus was operated at the column top pressure of 47 hPa, and the acrylic acid was distilled from the column top in order to purify continuously. The operating temperature at the distillation column bottom is 95° C. A polymerization inhibitor was added to the resultant condensate, and upper portions of tube sides of the first and second condenser were showered respectively with the resultant mixture in order to circulate. The area of the heat-transfer surface of the second condenser was 45% of that of the first condenser. Vapor was passed upward into the second condenser. The cooling water inlet temperature of the second condenser was 23° C. and the outlet temperature thereof was 25° C. A liquid from the cooling water outlet of the second condenser and cooling water was mixed and the resultant mixture was supplied to the cooling water inlet of the first condenser. The cooling water inlet temperature of the first condenser was 24° C. and the outlet temperature thereof was 36° C. As the result, the apparatus was operated for 60 days without question. After the apparatus was stopped and examined, it was observed that a polymerized product was not attached to tubes of the first and second condensers, and the second condenser. In addition, it was observed that an extremely small amount of the polymerized product was only attached to pipings connected to the second condenser and the ejector.

EXAMPLE 2

Figure 4:
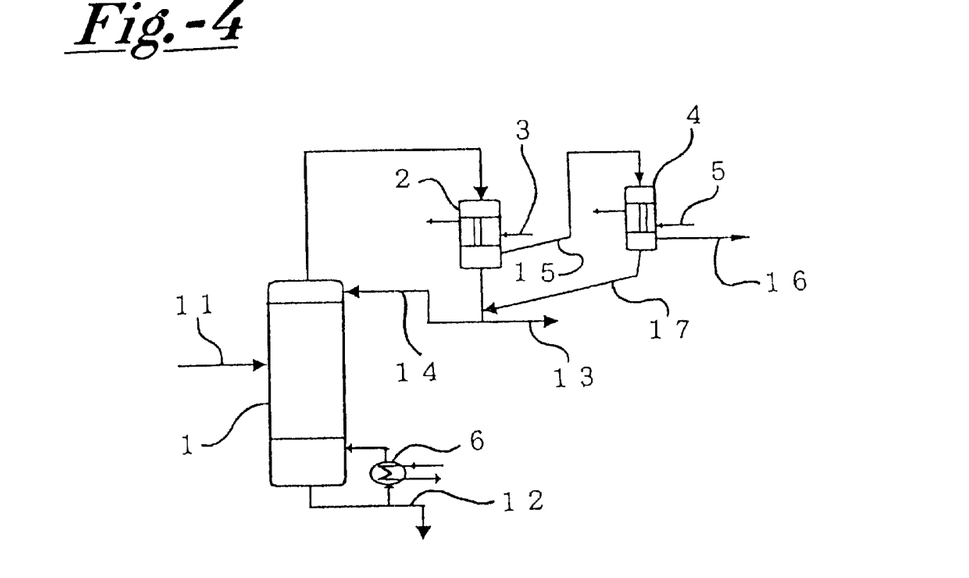
FIG. 4 is a rough explanation figure describing an example according to the present invention.

As is shown in FIG. 4, a distillation apparatus was used and equipped with a distillation column, a reboiler, a first vertical shell-and-tube-type condenser, a second vertical shell-and-tube-type condenser and an ejector. A solution containing methyl methacrylate was supplied to the distillation column, the apparatus was operated at the column top pressure of 160 hPa, and the methyl methacrylate was distilled from the column top in order to purify continuously. The operating temperature at the distillation column bottom is 50° C. A polymerization inhibitor was added to the resultant condensate, and upper portions of tube sides of the first and second condenser were showered respectively with the resultant mixture in order to circulate. The area of the heat-transfer surface of the second condenser was 5% of that of the first condenser. Vapor was passed downward into the second condenser. The cooling water inlet temperature of the first condenser was 30° C. and the outlet temperature thereof was 45° C. The cooling water inlet temperature of the second condenser was 2° C. and the outlet temperature thereof was 4° C. As the result, the apparatus was operated for 90 days without question. After the apparatus was stopped and examined, it was observed that a polymerized product was not attached to tubes of the first and second condensers, the second condenser, and pipings connected to the second condenser and the ejector.

EXAMPLE 3

Figure 5:
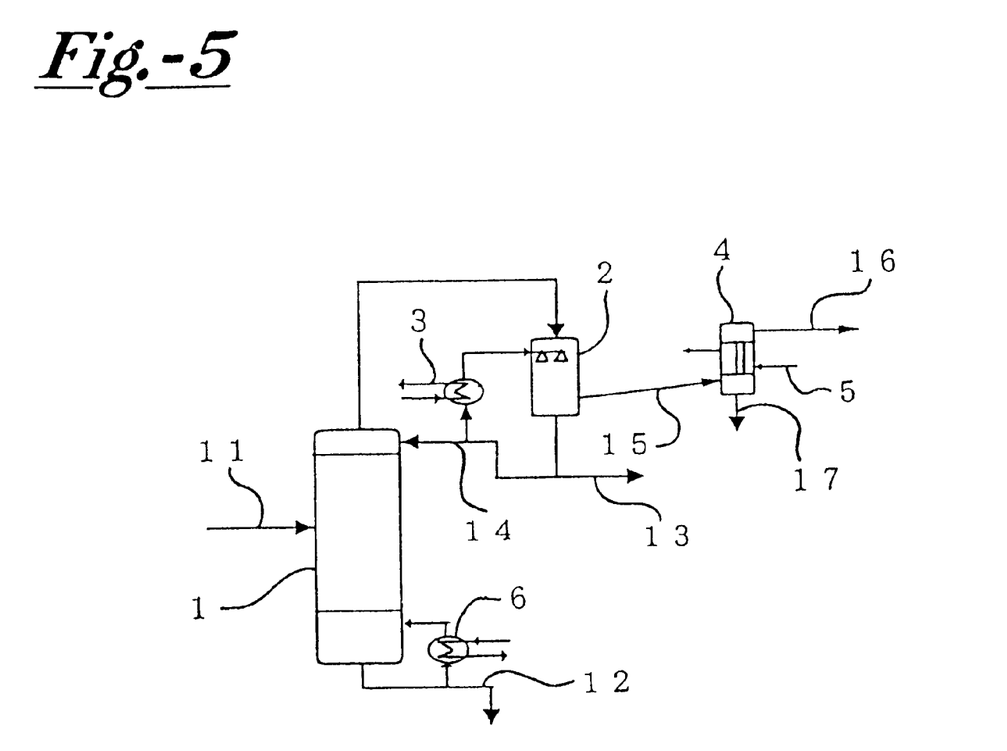
FIG. 5 is a rough explanation figure describing an example according to the present invention.

As is shown in FIG. 5, a distillation apparatus was used and equipped with a distillation column, a reboiler, a first barometric type condenser, a second vertical shell-and-tube-type condenser and an ejector. A solution containing hydroxyethyl methacrylate was supplied to the distillation column, the apparatus was operated at the column top pressure of 2.7 hPa, and the hydroxyethyl methacrylate was distilled from the column top in order to purify continuously. The operating temperature at the distillation column bottom is 95° C. Inner portions of the barometric type condenser were showered with a distillate containing a polymerization inhibitor in order to circulate. The area of the heat-transfer surface of the second condenser was about half of that of a liquid cooler of the barometric type condenser. Vapor was passed upward into the second condenser. The cooling water inlet temperature of the first condenser was 30° C. and the outlet temperature thereof was 37° C. The cooling water inlet temperature of the second condenser was 7° C. and the outlet temperature thereof was 10° C. As the result, the apparatus was operated for 30 days without question. After the apparatus was stopped and examined, it was observed that a polymerized product was not attached to tubes of the first and second condensers, and the second condenser. In addition, it was observed that an extremely small amount of the polymerized product was only attached to pipings connected to the second condenser and the ejector.

COMPARATIVE EXAMPLE 1

The acrylic acid was purified continuously in the same way of Example 1 except that the second condenser was not placed between the first condenser and the ejector. Then, the cooling water inlet temperature of the first condenser was 22° C. and the outlet temperature thereof was 33° C. As the result, the column top pressure could not be maintained at 47 hPa on the 30th day and began to arise. After the apparatus was stopped and examined, it was observed that a polymerized product was attached to pipings connected to the first condenser and the ejector.

COMPARATIVE EXAMPLE 2

The methyl methacrylate was purified continuously in the same way of Example 2 except that the second condenser was not placed between the first condenser and the ejector. As the result, the column top pressure could not be maintained at 160 hPa on the 50th day and began to arise. After the apparatus was stopped and examined, it was observed that a polymerized product was attached to pipings connected to the first condenser and the ejector.

COMPARATIVE EXAMPLE 3

The hydroxyethyl methacrylate was purified continuously in the same way of Example 3 except that the second condenser was not placed between the first condenser and the ejector. As the result, the column top pressure could not be maintained at 2.7 hPa on the 20th day and began to arise. After the apparatus was stopped and examined, it was observed that a polymerized product was attached to pipings connected to the first condenser and the ejector.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A distillation process for an easily polymerizable substance-containing solution comprising an easily polymerizable substance, wherein the process comprises the steps of:
   a) distilling the easily polymerizable substance-containing solution to obtain a vapor (1);
   b) condensing the vapor (1) in a condenser for vapor (1) to obtain a vapor (2) and a condensate (1), wherein said vapor (2) comprises a first portion of said easily polymerizable substance, and wherein said condensate (1) comprises a second portion of said easily polymerizable substance;
   c) condensing the vapor (2) including said first portion of said easily polymerizable substance in a condenser for vapor (2) to obtain a condensate (2);
   d) causing said condensate (2) from the condenser for vapor (2) to join with said condensate (1) from the condenser for vapor (1);
   e) controlling a refrigerant inlet temperature of the condenser for vapor (1) in a range of 3 to 50° C.;
   f) controlling a refrigerant inlet temperature of the condenser for vapor (2) in a range of 0 to 50° C.;
   g) controlling the refrigerant inlet temperature of the condenser for vapor (2) to be not greater than the refrigerant inlet temperature of the condenser for vapor (1) such that the condenser for vapor (2) condenses a low boiling point component; and h) controlling a temperature of the refrigerant inlet temperature of one of the condensers relative to a refrigerant outlet temperature of said condenser such that the refrigerant inlet temperature of said condenser is lower than the refrigerant outlet temperature of said condenser by 1 to 25° C.

2. A distillation process according to claim 1, and further comprising the step of condensing not less than 85% of the vapor (1) in the condenser for vapor (1).

3. A distillation process according to claim 1, wherein the condenser vapor (1) is a vertical shell-and-tube-type heat exchanger having a shell side and a tube side, and further comprising the step of passing the vapor (1) into the tube side and then passing the vapor (1) downwardly through the condenser for vapor (1).

4. A distillation process according to claim 1, wherein the condenser for vapor (2) is a vertical shell-and-tube-type heat exchanger having a shell side and a tube side, and further comprising the step of passing the vapor (2) into the tube side and then passing the vapor (2) upwardly through the condenser for vapor (2).

5. A distillation process according to claim 1, and further comprising the steps of showering a showering solution downwardly in the condenser for vapor (1), selecting a stabilizer for inhibiting polymerization, and introducing said stabilizer into the showering solution showered downwardly.

6. A distillation process according to claim 5, and further comprising the step of including one of the condensates in said showering solution.

7. A distillation process according to claim 1, and further comprising the step of returning at least one portion of the condensate (1) from the condenser for vapor (1) back to a distillation column for the step of distilling the easily polymerizable substance-containing solution.

8. A distillation process according to claim 1 and further comprising the step of operating a distillation column, for the step of distilling the easily polymerizable substance-containing solution, at a distillation temperature of 30 to 150° C.

9. A distillation process according to claim 1, wherein each of the condenser for vapor (1) and the condenser for vapor (2) includes a heat-transfer surface, and further comprising the step of including the heat-transfer surface of the condenser for vapor (2) to be 1 to 100% of the heat-transfer surface of the condenser for vapor (1).

10. A distillation process according to claim 1 and further comprising the step of selecting (meth)acrylic acid as the easily polymerizable substance.

11. A distillation process according to claim 1 and further comprising the step of selecting (meth)acrylic acid ester as the easily polymerizable substance.

12. A distillation process for an easily polymerizable substance-containing solution comprising the steps of:

a) distilling the easily polymerizable substance-containing solution to obtain a vapor (1), wherein the step of distilling the easily polymerizable substance-containing solution further comprises the step of selecting (meth)acrylic acid or (meth)acrylic acid ester as a component in the easily polymerizable substance-containing solution, wherein the step of distilling the easily polymerizable substance-containing solution further comprises the step of operating a distillation column for the step of distilling the easily polymerizable substance-containing solution at a distillation temperature of 30 to 150° C.;

b) condensing the vapor (1) in a condenser for vapor (1) to obtain a vapor (2) and a condensate (1), wherein said condensate (1) includes a second portion of the (meth)acrylic acid or (meth)acrylic acid ester, wherein said vapor (2) includes a first portion of the (meth)acrylic acid or (meth)acrylic acid ester, wherein said condensate (1) includes a stabilizer, wherein the step of condensing the vapor (1) further comprises the step of condensing not less than 85% of the vapor (1) in the condenser for vapor (1), wherein the step of condensing the vapor (1) further comprises the step of controlling a temperature of the step of condensing the vapor (1);

c) condensing the vapor (2) including said first portion of the (meth)acrylic acid or (meth)acrylic acid ester in a condenser for vapor (2) to obtain another condensate (2), wherein the step of condensing the vapor (2) further comprises the step of controlling a temperature for the step of condensing the vapor (2) at a temperature less than the temperature of the step of condensing the vapor (1);

d) causing said another condensate (2) to join with the condensate (1) having the stabilizer;

e) controlling a refrigerant inlet temperature of the condenser for vapor (1) in a range of 3 to 50° C.;

f) controlling a refrigerant inlet temperature of the condenser for vapor (2) in a range of 0 to 50° C.;

g) controlling the refrigerant inlet temperature of the condenser for vapor (2) to he not greater than the refrigerant inlet temperature of the condenser for vapor (1) such that the condenser for vapor (2) condenses a low boiling point component; and h) controlling a temperature of the refrigerant inlet temperature of one of the condensers relative to a refrigerant outlet temperature of said condenser such that the refrigerant inlet temperature of said condenser is lower than the refrigerant outlet temperature of said condenser by 1 to 25° C.

13. A distillation process for distilling (meth)acrylic acid or (meth)acrylic acid ester comprising the steps of:

a) distilling (meth)acrylic acid or (meth)acrylic acid ester to obtain a vapor (1);

b) condensing the vapor (1) in a first condenser having a first refrigerant inlet temperature to obtain a condensate (1) and a vapor (2), wherein the condensate (1) includes a second portion of said (meth)acrylic acid or (meth)acrylic acid ester;

c) condensing the vapor (2) in a second condenser having a second refrigerant inlet temperature to obtain a condensate (2), wherein the condensate (2) includes a first portion of said (meth)acrylic acid or (meth)acrylic acid ester;

d) controlling the first and second refrigerant inlet temperatures such that the second refrigerant inlet temperature is lower than the first refrigerant inlet temperature to condense a low boiling component in the second condenser, c) controlling a refrigerant inlet temperature of the first condenser in a range of 3 to 50 d) controlling a refrigerant inlet temperature of the second condenser in a range of 0 to 50 e) controlling the refrigerant inlet temperature of the second condenser to be not greater than the refrigerant inlet temperature of the first condenser such that the second condenser condenses a low boiling point component; and h) controlling a temperature of the refrigerant inlet temperature of one of the condensers relative to a refrigerant outlet temperature of said condenser such that the refrigerant inlet temperature of said condenser is lower than the refrigerant outlet temperature of said condenser by 1 to 25° C.

* * * * *